No. 632,539. Patented Sept. 5, 1899.
J. ROSS.
HAY PRESS.
(Application filed Dec. 13, 1898.)
(No Model.) 2 Sheets—Sheet 1.
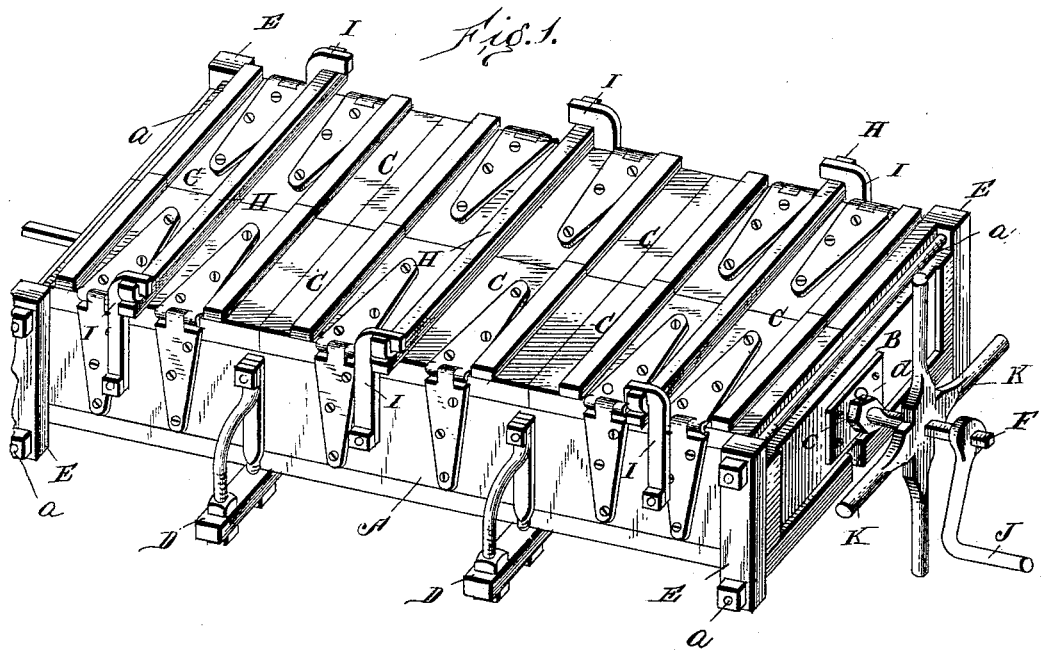
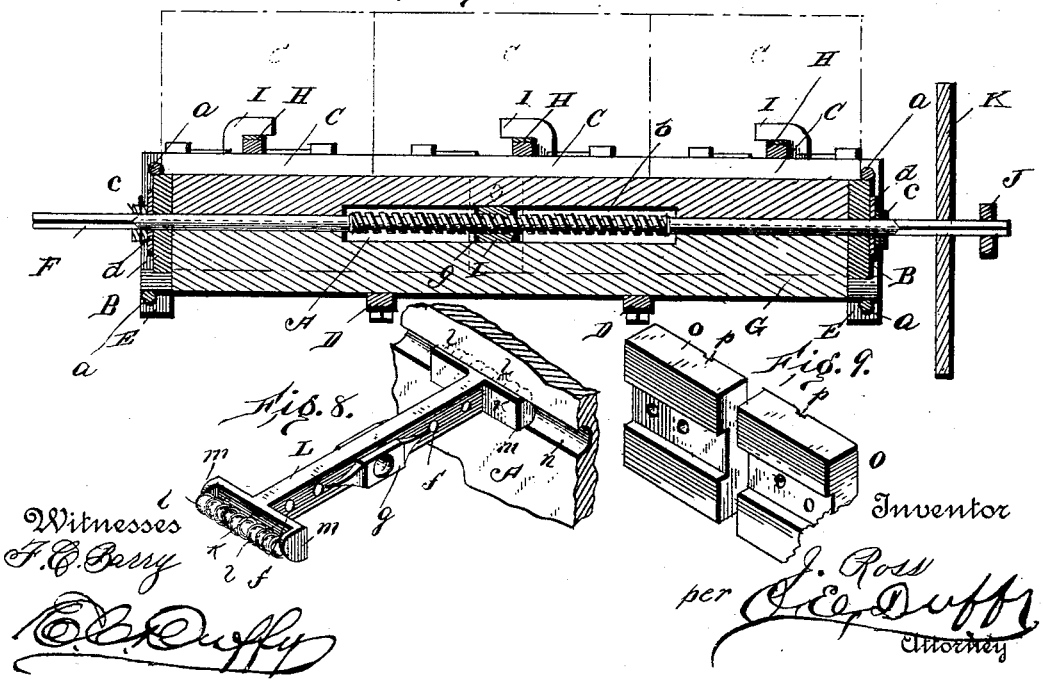
Witnesses
F. C. Berry
Inventor
J. Ross
per
Attorney
THE NORRIS PETERS CO., PHOTO-LITHO., WASHINGTON, D. C.

No. 632,539. Patented Sept. 5, 1899.
J. ROSS.
HAY PRESS.
(Application filed Dec. 13, 1898.)
(No Model.) 2 Sheets—Sheet 2.
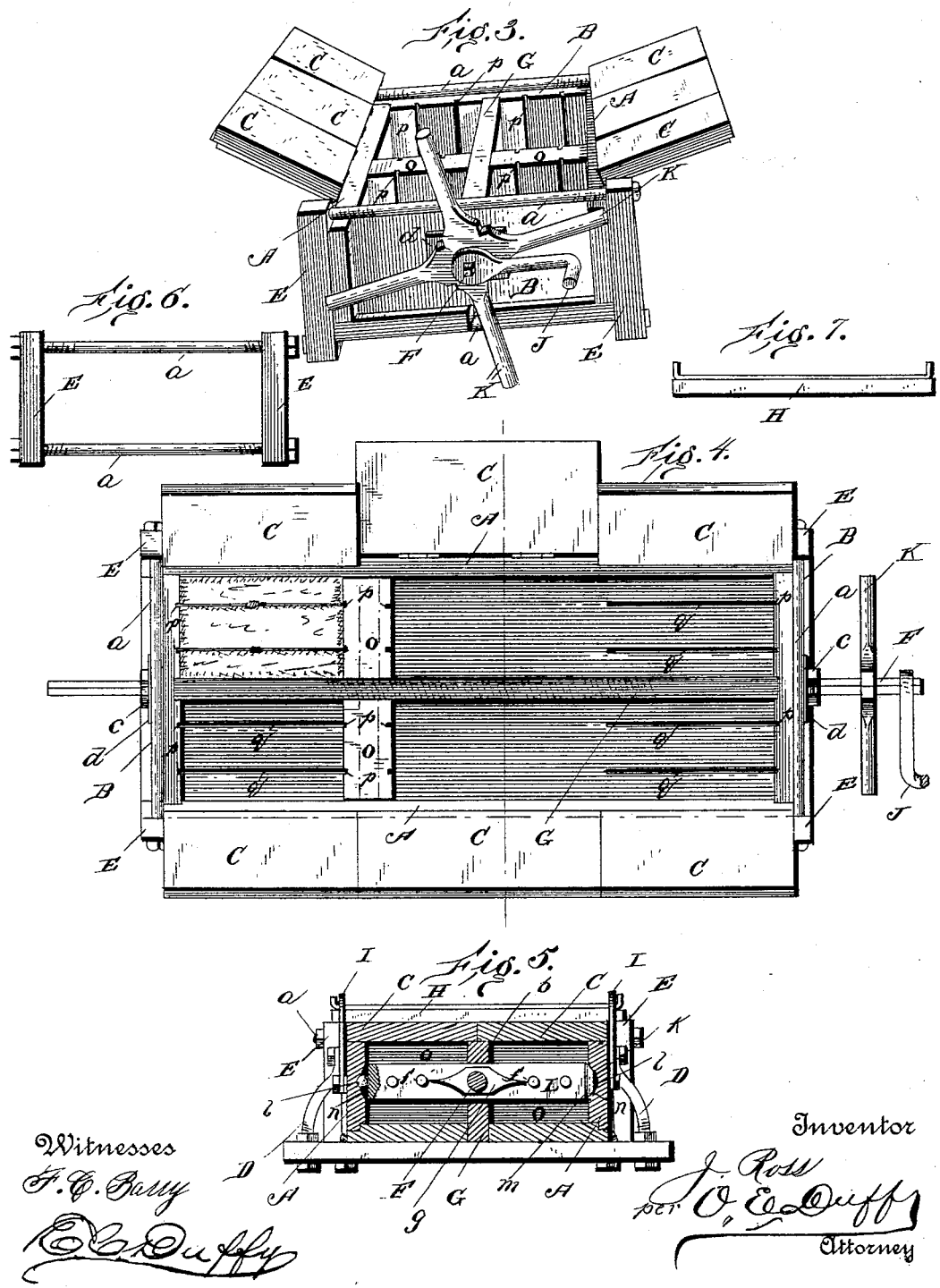
Witnesses
F. C. Barry
R. C. Duffy
Inventor
J. Ross
per J. C. Duffy
Attorney

UNITED STATES PATENT OFFICE.

JOSEPH ROSS, OF VINCENNES, INDIANA, ASSIGNOR OF ONE-HALF TO JOHN W. NORDHAUS, OF SAME PLACE.

HAY-PRESS.

SPECIFICATION forming part of Letters Patent No. 632,539, dated September 5, 1899.

Application filed December 13, 1898. Serial No. 699,124. (No model.)

*To all whom it may concern:*

Be it known that I, JOSEPH ROSS, of Vincennes, in the county of Knox and State of Indiana, have invented certain new and useful Improvements in Hay-Balers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to bale-presses for baling hay or other fibrous material and is particularly designed for farm products.

The object of the invention is to produce a cheap, simple, and substantial baling-press for farmers' or like use.

A further object of the invention is to have a portable baling-press which can be removed from place to place as occasion may require; and another object is to so construct the baling-press that it may be knocked down, taken apart either for transportation or storage, each part being separate and interchangeable with like parts when broken.

A further object of the invention is to bale two or more bales at the same time and to arrange the compressor to operate both ends alternately in such manner as that when the press is compressing two bales at one end the other end of the baling-press is being filled with material ready for compression, and so on alternately until finished. Each end of the baling-press is provided with doors for the separate removal of the bales when compressed.

A further object of the invention is in forming an antifriction cross-head (which carries the compressor or follower) of two T-shaped portions or pieces united in the center to a middle portion which is screw-threaded, the outer ends of the said T-pieces being formed to carry antifriction-balls, the balls also working in the sides of the baling-press. By means of this cross-head construction I prevent the buckling of the screw and facilitate the easy traveling of the compressor.

The invention consists in constructing a wagon-like box of separate pieces, dividing it longitudinally through the center, placing therein a spindle screw-threaded part of its length, a traveling cross-head screw-threaded to fit said spindle, said cross-head being formed with T-shaped pieces to carry antifriction rollers or balls, the sides of the box also having grooves for the balls to work in, the said box being provided with doors, braces, and clamps to prevent the spreading of the hay while being compressed, and in other details of invention, as will be hereinafter described, and particularly pointed out in the claims.

Referring to the drawings, Figure 1 shows a perspective view of the hay-baling press in a closed position; Fig. 2, a vertical central longitudinal section. Fig. 3 is an end view, in perspective, looking into the baling-press from the end. Fig. 4 shows a top plan view. Fig. 5 is a tranverse vertical central section. Fig. 6 is a plan view of the yoke; Fig. 7, a side view of the clamp; Fig. 8, a perspective view of the cross-head, showing the T-shaped end and antifriction balls or rollers; and Fig. 9, a perspective view of one side of the compressor head or follower gouged out to fit the cross-head.

The same letters will indicate like parts in all the figures.

A is the side of the baling-press, and B the ends. C C are doors or tops provided with hinges, cleats, &c.

D D are the braces on side pieces for bracing up the sides of the baling-press.

E E are the yokes, having bolts $a$ for holding them together, and $a'$ the bottom. The yokes are placed on the ends of the box and one can be placed on the middle, if found necessary.

When all parts of the baling-press are placed together by first placing the bottom $A'$ in a horizontal position, then setting up the sides A against the uprights or braces D D, then placing the lower half of the central partition G longitudinally in the box, then the screw-threaded spindle in position centrally on the lower half of said partition, the cross-head being previously placed on the spindle, then putting the end pieces B B of the box on the square ends of the spindle and pushing them in place between the front and rear ends of the side pieces A A, then putting on the yokes E E and screwing them up tightly, which holds the bottom sides and ends in position, the upper half of the central partition is put in place over the lower half. The end collars $c\ c$ are then placed on the square ends of the spindle F. The doors C C, which are hinged to the sides, are then closed, hay being previously placed in the box. The clamps H H are now put on and arranged transversely across the said doors, when the pivot-hooks I I, which are pivoted to the sides, are pushed over the ends of the clamps, when the press is ready for use. The yokes and screws being bolted up tightly secure all the parts together, preventing them from spreading while the bale is being compressed.

F is the central spindle or screw-shaft, screw-threaded a portion of its length and having square ends which extends entirely through the box and also through the division-wall or partition, and G is the division-wall or portion which is provided with a longitudinal slot, as at $b$. (See Fig. 2.) This slot $b$ is designed to permit the cross-head to slide through it, and the bottom and top of the slot forms a guide for the cross-head.

H H are the clamps placed across the doors, having upturned ends to hold the hooks from sliding off, and I I the pivoted hooks that hold the clamps in position.

J is the crank for operating the screw-shaft to run the follower up until the hay is partially pressed, and K K are hand-wheel levers, also on the shaft, to more firmly compress the bale until the hay is tightly packed.

$c\ c$ are collars placed on each end of the shaft with pins through them to hold the shaft in position and prevent lateral motion. The crank and lever may be placed on either end of the shaft. $d\ d$ are metal plates secured to the ends B and form journal-bearings for the screw-shaft. The collars $c\ c$ on the shaft F also serve as stays or braces to hold the ends of the box or baler from undue strain.

L is the cross-head, having bolt-holes $f f$ and a central enlarged portion or boss $g$ formed integral with the head. This central portion of the cross-head is provided with screw-threads and is deep and wide, so as to give the screw-shaft or spindle a long bearing to prevent the shaft from buckling or bending when there is unequal strain put on the screw from one side or the other of the baling-press, caused by more or less hay being placed in one side than the other. The boss tapers off from each side of the screw-hole to nothing in such manner that the strain is distributed equally over the iron cross-head. The T-shaped ends $k$ of the cross-head are hollowed out or concave to hold balls $l$, and it has at each end a flange or lip $m$ to prevent the displacement of the balls while in operation, and $n$ is a concave slot in the side of the bale-press to also hold the balls and in which they work. (See Fig. 8.) Fig. 9 shows a block $o$, of which there are four, one on each side of the cross-head on each side of the division-wall. These blocks are gouged out to fit the contour of the iron forming the cross-head and with it form the follower or compressor. The blocks are secured to the cross-head by means of bolts passing through holes $f f$. The vertical sides of the blocks slide along against the division-wall on one side and against the sides of the box on the other and are provided on their faces with slots $p\ p$ for the passage of the binding-wire and also present a smooth face to the hay. These blocks $o\ o$ also stiffen the cross-head against lateral strain.

Referring again to the antifriction-balls arranged in the T-piece of the cross-head, they and the said T-piece present a long bearing, so that if one side of the cross-head has a greater pressure than the other it is transferred to the T-piece and balls, and thence to the side of the box, and by this means the pressure is taken from the screw-shaft to the side of the bale-box, and thus the shaft is prevented from bending and buckling, and a further use of the T and antifriction-balls is to facilitate the easy movement of the follower along the sides of the box. The T and balls also carry the weight of the followers, and thus prevent friction on the sides of the box, the sides of the division-wall, and the bottom and top of the box, as would otherwise be the case without the ball-carrier.

The operation is as follows: The bale-box being put together (which may rest upon trestles or a wagon-frame) and the doors thrown back, one end of the baling-press is filled with hay. The doors are then fastened down and clamped. The single crank is then turned, running the follower up against the hay, pressing it home; but to finally compress it hard the hand-levers K are now turned with greater force and pressure, when the bale is compressed ready for binding. The binding-wire passing through slots $q$ in the bottom of the baling-press and through slots $p$ in the follower, the doors are then opened, when the wire is fastened and the bale bound and removed. While the above operation is going on, the other end of the baling-box is being filled with hay. The screw-shaft is now turned in the opposite direction, the follower also taking an opposite course, when the hay previously prepared is pressed and bound, as above described. This operation goes on repeatedly and alternately until the desired quantity of hay is baled.

When it is desired to transport the baling-press, it may be taken to pieces and packed or stored, as the case may be. Of course the same may be done when to be shipped in quantities from the factory or stored in bulk, or from place to place on the farm, or placed on the running-gear of a wagon and be used as a wagon-body with convenience.

It will be observed that all the parts are interchangeable, so that if any are broken or lost a new one can be substituted.

It will also be observed that modifications may be made in the several details without departing from the spirit of my invention. I do not therefore wish to be confined to the exact form shown and described, but consider myself entitled to all such modifications within the scope thereof.

Having thus described my invention and the best means at present known to me for carrying the same into effect, what I claim as new, and desire to secure by Letters Patent, is—

1. In a knockdown baling-press comprising the sides, ends and bottom, the central division-wall running lengthwise of the press and forming a double chamber, the compressing screw-shaft running lengthwise the press and provided with locking means for holding the parts together, the cross-head carrying the followers which are secured to the cross-head and operating in said chambers, all combined and arranged to operate substantially as described.

2. The combination in a baling-press comprising the sides, ends, and bottom, the slotted division-wall running lengthwise of the press, the compressing screw-shaft located in the division-wall, the cross-head adapted to slide in said slot, the followers on each side of said division-wall, and mounted on said cross-head, the retaining-collars on the ends of said shaft, the journal-bearings secured to the ends of the baling-press and means for operating said screw-shaft, substantially as set forth.

3. The combination of a baling-press having the slotted division-wall running lengthwise thereof, the screw-shaft centrally located in the press, a cross-head having lateral arms, followers secured thereto said arms bearing against the inner side of the press-box, and adapted to stay the shaft when unequal pressure is exerted on one side of the cross-head more than the other, clamping devices to prevent the spreading of the box, said clamping devices also holding down the doors while the bale is being compressed, substantially as described.

4. The knockdown baling-press box comprising the sides ends and bottom in combination with the yokes E for transversely holding them together, the division-wall running lengthwise of the press, the screw-shaft and the collars on said shaft arranged to hold the box together longitudinally, the clamps H and hooks I for holding down the doors and also to prevent spreading of the box, substantially as set forth.

5. The combination in a hay-baling press of the central division-wall running lengthwise of the press, the screw-shaft running in said wall, the cross-head carried by said shaft, said cross-head having T-pieces extending laterally from said head, the T-pieces being concaved to hold antifriction-balls and flanges to retain said balls in position, substantially as set forth.

6. The combination in a baling-press box of the screw-shaft longitudinally and centrally located, the cross-head and follower, carried thereby, said cross-head having a central female-screw portion in which the screw-shaft works, and T-shaped end pieces having ball-bearings, said T-shaped pieces and balls being adapted to work and travel in concave grooves in the sides of the box, substantially as set forth.

7. The combination in a baling-press of the screw-shaft and cross-head, said cross-head adapted to carry the followers having T-pieces formed to carry antifriction balls or rollers, substantially as set forth.

8. As an article of manufacture the cross-head having T-shaped pieces at each end formed to carry antifriction-balls, and the followers adapted to be secured thereto, substantially as set forth.

In testimony that I claim the foregoing as my own I affix my signature in presence of two witnesses.

JOSEPH ROSS.

Witnesses:
JOHN W. NORDHAUS,
JOHN B. ARNOLD.